(12) United States Patent
Kern et al.

(10) Patent No.: US 10,702,901 B2
(45) Date of Patent: Jul. 7, 2020

(54) GUIDE ROLLER

(71) Applicant: Aktiebolaget SKF, Gothenburg (SE)

(72) Inventors: Henning Kern, Schweinfurt (DE); Benjamin Michael, Werneck (DE)

(73) Assignee: AKTIEBOLAGET SKF, Gothenburg (SE)

( * ) Notice: Subject to any disclaimer, the term of this patent is extended or adjusted under 35 U.S.C. 154(b) by 79 days.

(21) Appl. No.: 15/861,784

(22) Filed: Jan. 4, 2018

(65) Prior Publication Data
US 2018/0193890 A1 Jul. 12, 2018

(30) Foreign Application Priority Data

Jan. 11, 2017 (DE) .................. 10 2017 200 331
Jan. 11, 2017 (DE) .................. 20 2017 100 091 U

(51) Int. Cl.
| | | |
|---|---|---|
| *B21B 39/16* | (2006.01) | |
| *F16C 33/58* | (2006.01) | |
| *F16C 19/18* | (2006.01) | |
| *F16C 13/00* | (2006.01) | |
| *B21B 37/46* | (2006.01) | |
| *B21B 1/18* | (2006.01) | |
| *B21B 1/16* | (2006.01) | |
| *B21B 39/14* | (2006.01) | |
| *B23P 15/00* | (2006.01) | |

(52) U.S. Cl.
CPC .............. *B21B 39/165* (2013.01); *B21B 1/18* (2013.01); *B21B 37/46* (2013.01); *F16C 13/003* (2013.01); *F16C 13/006* (2013.01); *F16C 19/184* (2013.01); *F16C 33/586* (2013.01); *B21B 1/16* (2013.01); *B21B 2275/04* (2013.01)

(58) Field of Classification Search
CPC ......... B21B 39/165; B21B 1/18; B21B 37/46; B21B 1/16; B21B 2275/04; F16C 13/003; F16C 13/006; F16C 19/184; F16C 33/586; F16C 13/00; B23P 15/00
USPC ......................................... 72/250
See application file for complete search history.

(56) References Cited

U.S. PATENT DOCUMENTS

| | | | | |
|---|---|---|---|---|
| 4,295,356 A | * | 10/1981 | Fabris | B21B 39/165 72/250 |
| 4,373,367 A | * | 2/1983 | Fabris | B21B 39/165 72/250 |
| 4,680,953 A | * | 7/1987 | Fabris | B21B 39/165 226/187 |
| 4,790,164 A | * | 12/1988 | Rothe | B21B 39/165 226/177 |

(Continued)

FOREIGN PATENT DOCUMENTS

| | | |
|---|---|---|
| DE | 20109015 U1 | 8/2001 |
| DE | 10126219 C2 | 4/2003 |

*Primary Examiner* — Adam J Eiseman
*Assistant Examiner* — Mohammed S. Alawadi
(74) *Attorney, Agent, or Firm* — Garcia-Zamor Intellectual Property Law, LLC; Ruy Garcia-Zamor; Bryan Peckjian

(57) ABSTRACT

A guide roller configured to guide a wire to or from a work roller in a wire rolling line includes a rolling-element bearing having a rotatable outer ring, a fixed inner ring, and rolling elements between the outer ring and the inner ring. The outer ring has a profile configured to guide the wire on a radially outer surface thereof. The guide roller is configured as a double row preloaded rolling-element bearing and is installable as a finished component on a fixed shaft of the wire rolling line without adjusting the preload.

14 Claims, 1 Drawing Sheet

(56) References Cited

U.S. PATENT DOCUMENTS

| | | | | |
|---|---|---|---|---|
| 5,937,689 A | * | 8/1999 | Fabris | B21B 39/165 |
| | | | | 226/177 |
| 6,151,946 A | * | 11/2000 | Fabris | B21B 39/165 |
| | | | | 72/250 |
| 7,062,946 B2 | * | 6/2006 | Palzer | B21B 39/165 |
| | | | | 72/250 |
| 2018/0193890 A1 | * | 7/2018 | Kern | B21B 39/165 |

* cited by examiner

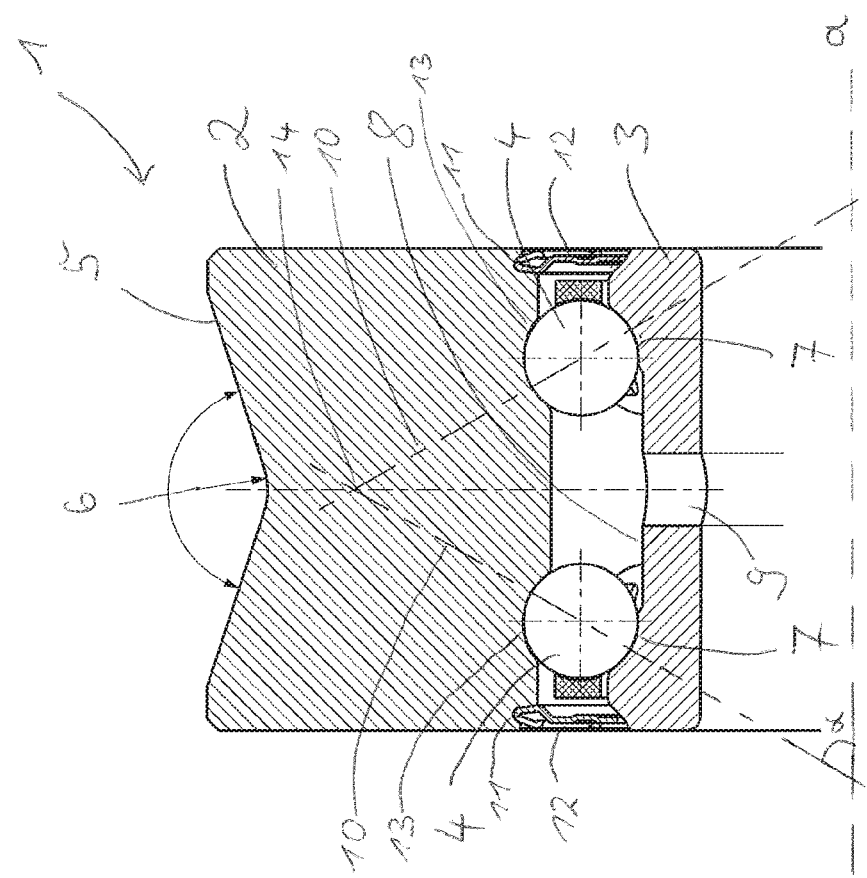

GUIDE ROLLER

CROSS-REFERENCE

This application claims priority to German patent application no. 10 2017 200 331.6, filed on Jan. 11, 2017, and German patent application no. 20 2017 100 091.5, filed on Jan. 11, 2017, the contents of which are fully incorporated herein by reference.

TECHNOLOGICAL FIELD

The disclosure relates to a guide roller for guiding a wire to or from a work roller in a wire rolling line, which guide roller includes an outer casing having a profiling for guiding the wire, which is rotatably supported via roller elements with respect to a fixed inner ring.

In the manufacturing of wire in a wire rolling mill, wire having a nominal initial thickness is first produced. The initial thickness usually corresponds to a multiple of the diameter that the finished wire is to have. The wire is then supplied to a wire rolling line. A plurality of wire rolling stands is disposed therein in series, through which the wire is guided. In each wire rolling stand at least two work rollers influence the wire, whereby it is reduced in its diameter. The exact guiding of the wire to the individual wire stands or away from the wire stands is accomplished by guide rollers that have a profile on their outer circumference suited to guiding the wire.

In known wire rolling lines, the guide rollers are located in front of and/or behind the individual wire stands at positions where the wire enters into the wire rolling stand. Here—from wire rolling stand to wire rolling stand—to the degree that the diameter of the wire decreases, an increase of the wire speed gradually results. The first wire rolling stands, viewed in the wire-conveyance direction, still roll the wire with relatively low speed, while the speed increases from wire rolling stand to wire rolling stand. The last wire rolling stands receive the wire already having extremely high speed (up to 120 m per second) and roll the wire with corresponding speed into its final form.

While in the continuous process no problems arise in this respect—the individual guide rollers in the respective wire stands rotate only with their corresponding speed—difficulties arise when a newly-to-be-rolled wire enters into the wire rolling line for the first time. While no problematic operation is to be observed in the front region of the line with still relatively low speeds, the wire appears in the last wire rolling stands or on the corresponding guide rollers with considerable speed, with the result that large load peaks are observed in particular on the guide rollers. When impinging on the guide roller, the wire with high speed must accelerate the guide roller out of the rest position into the corresponding rotational speed, which leads to high bearing loads. The outer surface of the guide roller, but also the bearing of the guide roller, therefore starts to wear after a relatively short time, which correspondingly often makes necessary repairs and thus correspondingly often removal- and installation-processes, which in turn respectively lead to a temporary stoppage of the wire rolling line.

From DE 201 09 015 U1 guide rollers are known in which the roller surface is simultaneously configured as the outer ring of the rolling-element bearing. The average thickness of the outer casing is small in relation to the other bearing dimensions in order to maintain a smallest-possible mass moment of inertia. It is thereby achieved that the rotating part of the guide roller has a significantly reduced mass moment of inertia, which means that the wire entering between two standing guide rollers causes a lower impingement shock, since less energy is needed to accelerate the guide rollers to the wire speed. Thus above all the roller surface can be preserved, which makes possible a longer service life. However, it has been found that the bearing assemblies of the guide rollers do not experience a longer service life to the same extent as the roller surface, since in principle higher accelerations show as higher load and thus can have a negative impact on the rollers and raceways. Exchange intervals of the guide rollers can thus indeed be extended but not avoided. In addition, each exchange requires a certain removal and installation time and thus causes a stoppage time of the wire rolling line.

Furthermore, from DE 101 26 219 C2 guide rollers including drive means are known, in order to reduce acceleration effects.

SUMMARY

As aspect of the disclosure is to further improve a guide roller for guiding a wire such that it is possible to operate the wire rolling line such that stoppage times of the wire rolling line are minimized.

According to the disclosure the guide roller is configured as a double row preloaded rolling-element bearing and is installable on a fixed shaft of the wire rolling line as a finished structural unit, without one or more parts of the structural unit having to be adjusted, in particular preloaded, with respect to one another in the course of the installation process.

According to the disclosure it is thus taken into account that previously known design-caused installation concepts of the guide rollers—namely installation of the guide rollers on the fixed shaft and targeted preloading of the rolling-element bearing assembly on the shaft are avoided, and the guide roller is configured as a finished structural unit, with the result that a preloading in the course of the installation process can be omitted. It is advantageous here that the assembly process can be effected more simply and more quickly, and incorrect adjusting of the guide rollers, which leads to reduced lifetime, can be reliably prevented.

It is preferably provided that the guide rollers include a common one-part outer ring and a common one-part inner ring for the two rolling-element rows. It is thereby achieved that the axial orientation of the raceways of the inner rings with respect to the raceways of the outer rings and thus the preload of the two rolling-element rows is already fixedly set before the installation of the guide roller on the shaft. The preload within the two rolling-element rows is thus determined by the dimensions of the bearing rings and of the rolling elements. The preload of the two rolling-element bearings is thus already effected in the manufacturing of the guide rollers and thus completely independently from the installation process of the guide roller in the application.

According to one advantageous embodiment the guide roller includes a common one-part outer ring and a common one-part inner ring for the two rolling-element rows. It is advantageous here that the number of parts of the guide roller decreases so that the installation can be effected more easily and more quickly. Due to the design of the one-part inner ring and of the one-part outer ring the preload within the bearing can be realized independently from the installation, since the uninstalled structural unit already has a predetermined preload.

One preferred design provides that the inner ring includes two raceways for the rolling-element rows, wherein the raceways enclose the rolling elements in a circumferential angular range <90 degrees and wherein between the two rolling-element rows an axially central region of the inner ring is displaced radially inward starting from regions radially inside the rolling elements and includes a radial opening for receiving lubricating grease. It is advantageous here that the guide roller can be configured as a pre-greased unit and is suited for relubrication. For this purpose the opening need only be connected to a lubricating device. The recessed region serves as a lubricant reservoir and is suited as a receiving space for lubricant.

Due to the preferred circumferential angular range <90 degrees on the inner ring lubricant can reach onto the pressure regions of the raceways particularly well.

In one preferred design the rolling-element bearing is configured as a double row angular contact ball bearing in back-to-back arrangement, wherein preferably both rows of the angular contact ball bearing are configured as two-point bearings. The design as a two point bearing is particularly advantageous with regard to the rolling resistance and friction resistance. Due to the high acceleration forces a low resistance has proved particularly advantageous for the rolling elements, since sliding phases of the rolling elements during the high acceleration can be reduced. Alternatively, however, four-point bearings also find use, which are advantageous with regard to the load-supporting capability. Due to the design as angular contact ball bearings, the impact forces exerted by the wire are supported particularly well radially as well as axially and can be radially and axially supported and diverted. According to the disclosure the axial diverting of the impact forces generated by the wire occurs within the one-part inner ring without it having to axially support this significantly itself.

In one preferred design the ratio of the mass moment of inertia of the outer ring to the outer diameter of the outer ring is greater than 0.001 kg*m. Particularly preferably a ratio greater than 0.0015 kg*m is provided. Due this much higher ratio of the mass moment of inertia to the outer diameter as compared to the previous guide rollers, the impact energy arising is advantageously converted into acceleration energy such that the forces exerted on the rolling elements do not lead to any excessive sliding phases of the rolling elements. Due to the high mass moment of inertial a certain wear of the outer ring is taken into account, to the benefit of reduced wear of the raceways and of the rolling elements. Due to the thereby minimized wear the preload, adjusted once, is held to an essentially constant preload, whereby the service life of the actual rolling-element bearing assembly in the guide roller is considerably extended in comparison to the known guide rollers, with minimized mass moment of inertia of the outer ring.

Due the ratio of the mass moment of inertia to the outer diameter of the outer ring being greater than 0.001 kg*m, a load on the rolling elements due to the occurrence of impacts is thus significantly reduced. However, the ratio of the mass moment of inertia to the outer diameter of the outer ring should not exceed 0.004 kg*m, since above this value the wear of the outer ring to the benefit of the service life increase of the rolling-element bearing and raceways would in turn reduce the overall service life. Advantageously for an optimized service life of the guide roller, wherein both the outer ring and the rolling-element bearing assembly have wear that is optimized and mutually adapted with regard to the overall service life, the ratio falls in a range of the ratio of the mass moment of inertia to the outer diameter of the outer ring of 0.001 kg*m to 0.004 kg*m. It is thereby particularly preferred when the ratio of the pitch circle diameter to the outer diameter of the outer ring is less than 0.5. This ratio of the pitch circle diameter to the outer diameter, in combination with the ratio of the mass moment of inertia to the outer diameter of the outer ring of 0.001 kg*m to 0.004 kg*m has proved particularly advantageous.

One preferred design provides that the cones formed by the pressure lines intersect within the outer ring. It is advantageous here that even with wear of the outer ring, wherein it is consumed in the region of the receiving of the wire and thus the diameter decreases, the cones formed by the pressure lines furthermore intersect within the outer ring. It is thereby achieved that with wear of the outer ring the pressure region of the wire approaches more and more the point of intersection of the cones formed by the pressure lines. An optimal load distribution of the guide roller is thus theoretically achieved when the wire to be guided, or the pressure region of the wire on the profiling, is located exactly in the point of intersection of the cones formed by the pressure lines. Due to the design such that the point of intersection intersects within the outer ring it is advantageously achieved that with wear of the guide roller ceasing the load conditions within the guide roller improve, and thus the losses of the guiding properties are compensated by an improving load distribution and load deflection.

It is particularly advantageous when the cones formed by the pressure lines intersect radially within the profiling in the outer ring.

One preferred design provides that the pressure lines of the two rows of the angular contact ball bearing enclose an angle $\alpha$ between 50 degrees and 70 degrees with respect to the axis of rotation a of the outer ring. It is thereby advantageously achieved that the angular contact ball bearing is optimized with regard to the ratio of the radial forces to the axial forces, so that on the one hand the radial force of the wire that is transformed into an axial component within the guide roller is reliably supported. Furthermore, the preload of the two angular contact ball bearings in this angular range can be precisely adjusted, since the radial component is not too high, but large enough to support the radial force.

One particularly preferred design provides that the pressure lines of the two rows of the angular contact ball bearing enclose an angle $\alpha$ between 50 degrees and 70 degrees with respect to the axis of rotation a of the outer ring and that in addition the cones formed by the pressure lines intersect within the outer ring, wherein the ratio of the mass moment of inertia to the outer diameter of the outer ring falls in a range from 0.001 kg*m to 0.004 kg*m.

A further advantageous design of the guide roller provides that the outer ring includes on its inner circumferential surface radial grooves for the receiving of seal elements on both sides axially outside the rolling-element rows. A sealed guide roller can thereby advantageously be featured as a finished structural unit. It is particularly advantageous here when the seal elements are designed as elastic seal elements clipped into the grooves. A design such that the seal surface doe not contact the inner ring is particularly preferred. Due to the seal elements the internal friction of the guide roller is thereby not increased but a seal function is provided. It is particularly advantageous when the seal elements are configured as radial seal discs having a gap seal between the radially inner end of the seal disc and the outer ring.

As already described above, in comparison to the prior art a known wear of the outer ring is deliberately taken into account. However, in order to keep this wear as low as possible it has proved particularly advantageous to form the outer ring as a whole by a turning process. Thus not only the raceways, but also the outer casing of the outer ring is turned. Furthermore for further wear resistance at least the outer casing can be blasted after the turning, for example, by shot peening, or sandblasting. In addition the outer casing can be provided with a wear-reducing layer, which is preferably applied to the outer casing by a thermal spraying method, most preferably high-speed flame spraying. A hard-metal layer, preferably made of a carbide compound, most preferably chromium carbide, titanium carbide, or tungsten carbide, has proved particularly suitable as material for the wear-reducing layer. In the region of the profiling the hard-metal layer preferably has a layer thickness between 0.4 mm and 1 mm, most preferably between 0.4 mm and 0.6 mm.

In order to further increase the wear resistance of the layer a hot isostatic pressing method can furthermore be provided after the spraying method, wherein, for example, the coated outer ring is subjected to a temperature between 1100 degrees Celsius and 1300 degrees Celsius and a pressure between 150 MPa and 250 MPa. The connection between the applied wear layer and the steel material of the outer ring is thereby improved. A previous hardening of the uncoated outer casing can thereby be omitted. Subsequently thereto a final grinding process of the outer ring and/or of the raceways can still be provided in order to correct a possible warpage of the outer ring and/or of the raceways.

The disclosure thus further relates to a method for manufacturing a guide roller including a one-part outer ring including an outer casing, wherein the guide roller is manufactured by the following method steps:

Introducing of a profiling in the outer casing of the outer ring using turning methods Blasting of the outer casing surface of the outer ring Coating of the outer casing surface using a thermal spraying method Hot isostatic pressing of the coated outer ring Grinding of a surface of the outer ring Installing of the inner ring, the rolling elements, and a rolling-element cage Installing of seal elements In comparison to the prior art the advantage is achieved by the disclosure that on the one hand the bearing function, which is determined by the rolling elements and the raceways, and on the other hand the guiding function, which is determined by the profiling of the outer casing, decrease to the same extent during the service life of the guide roller. At the end of the service life of the guide roller, which is determined by the shorter of the two service lives of bearing function and guiding function, the outer casing and the rolling-elements-raceways-combination is thus worn to the same degree and have reached the end of their respective service lives.

The disclosure furthermore relates to a work roller in a wire rolling line including a guide roller configured as finished structural unit.

The disclosure is described below on the basis of the FIGURE.

BRIEF DESCRIPTION OF THE DRAWING

The FIGURE is a side elevational view of a portion of a radial section of a guide roller according to the present disclosure.

DETAILED DESCRIPTION

In the FIGURE a guide roller is shown, which is configured as a finished structural unit. This means that the guide rollers are only comprised of a single component and need not first be assembled from various loose components. All components of the finished structural unit are already in their final position and arrangement and installed and disposed in the positions relative to the other components.

The guide roller is composed of the one-part outer ring 2, which includes an outer casing 5 that includes on its radially outer lying casing surface an integrally formed profiling 6 for a to-be-guided wire. For this purpose the profiling is preferably configured V-shaped or U-shaped. The profiling 6 is axially symmetrically configured such that a wire is guided centrally with respect to the outer ring.

The inner ring 3 is also configured one-part and includes two raceways 7. The outer ring 2 includes two corresponding raceways 13. Rolling elements 4 configured as balls are disposed between the raceways 7 and 13. The guide roller 1 is configured as a double row angular contact ball bearing, and the pressure lines 10 of the two rows of the angular contact ball bearing form an angle α with the axis of rotation a of the outer ring 2. The exemplary embodiment thereby respectively has an angle of 60 degrees. The double row angular contact ball bearing is itself preloaded, so that the two rolling element rows have a set preload pressure between their raceways 7, 13. This preload is applied during the assembly of the guide roller 1 and is determined from the ball diameter and the spacing of the raceways with respect to each other. The individual pressure lines 10 of each ball of a row of the angular contact ball bearing together form a cone. The two cones of the two rows of rolling elements intersect within the outer ring 2 on an imaginary circle 14. The two angular contact ball bearings of the guide roller are configured as two-point bearings and in a back-to-back arrangement with respect to each other. The central region 8 of the inner ring 3 has a smaller outer diameter than the raceways 7 of the inner ring 3. A receiving space for lubricating grease is thereby formed. A radial opening 9 connects an inner circumferential surface of the inner ring 3 to the receiving space and allows the angular contact ball bearing to be filled with lubricating grease. In the inner circumferential surface of the outer ring 2 two grooves 11 are incorporated axially outside the two ball rows, which grooves 11 serve for the receiving of seal elements 12, which are connected to the outer ring such that they rotate together with the outer ring. The seal elements are configured as seal discs made of metal-plate material. In the region of their radially inner end sides they form a gap seal with the outer circumferential surface of the inner ring 3 opposite the end side. Overall, a sealed guide roller configured as a finished structural unit is depicted, which can be installed on a shaft of a wire rolling stand without assembly or disassembly steps. The installation effort of this roller is thus minimized, whereby stoppage times due to exchange of guide rollers can be reduced.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved guide rollers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Guide roller
2 Outer ring
3 Inner ring
4 Rolling element
5 Outer casing
6 Profiling
7 Raceways
8 Central region
9 Radial opening
10 Pressure lines
11 Groove
12 Seal element
13 Raceways
14 Circle
a Axis of rotation

The invention claimed is:

1. A guide roller configured to guide a wire to or from a work roller in a wire rolling line, the guide roller comprising:
   a rolling-element bearing having an outer ring, an inner ring, and a plurality of rolling elements between the outer ring and the inner ring, the outer ring being rotatable and the inner ring being fixed, the outer ring having a radially outer surface, a profile of the radially outer surface defines a concave recess therein which, when viewed in cross-section, has one of a V-shape and a U-Shape, the concave recess being configured to guide the wire thereon,
   wherein the plurality of rolling elements comprises a first row of rolling elements and a second row of rolling elements,
   wherein the outer ring includes a first raceway and a second raceway, the second raceway being axially spaced from the first raceway, and
   wherein the inner ring includes a third raceway and a fourth raceway, the fourth raceway being axially spaced from the third raceway, wherein the inner ring and the outer ring are each formed by a single, unitary, one-piece component such that relative positions of the first raceway and the second raceway to the third raceway and the fourth raceway are predetermined upon manufacture thereof to facilitate the guide roller having a predetermined preload without requiring subsequent adjustment of the inner ring and/or the outer ring after assembly of the guide roller and thus allowing the guide roller to be installed as a finished component.

2. The guide roller according to claim 1, wherein the first raceway and the third raceway enclose the first row of rolling elements in a first circumferential angular range of less than ninety (90) degrees and the second raceway and the fourth raceway enclose the second row of rolling elements in a second circumferential angular range less than ninety (90) degrees and wherein an axially central region of the inner ring between the first row of rolling elements and the second row of rolling elements is set radially inward from the third raceway and the fourth raceway and includes a radial opening for receiving lubricating grease.

3. The guide roller according to claim 1, wherein the rolling-element bearing is configured in a back-to-back arrangement, and wherein the first raceway and the first row of rolling elements and the third raceway form a first angular contact ball bearing and the second raceway and the second row of rolling elements and the fourth raceway form a second angular contact ball bearing, the first and second angular contact ball bearings are configured as two-point bearings.

4. The guide roller according to claim 1, wherein a ratio of a mass moment of inertia of the outer ring to an outer diameter of the outer ring is greater than zero point zero zero one (0.001 kg*m) kilogram meters.

5. The guide roller according to claim 1, wherein a ratio of a mass moment of inertia of the outer ring to an outer diameter of the outer ring is greater than zero point zero zero one five (0.0015 kg*m) kilogram meters.

6. The guide roller according to claim 3, wherein a first cone formed by a first bearing pressure line of the first angular contact ball bearing and a second cone formed by a second bearing pressure line of the second angular contact ball bearing intersect each other inside the outer ring.

7. The guide roller according to claim 6, wherein the first cone and the second cone intersect radially along a circle lying radially inside a radially innermost portion of the profile of the outer ring.

8. The guide roller according to claim 6, wherein the first bearing pressure line and the second bearing pressure line, when viewed in cross-section, define an angle α between fifty (50) degrees and seventy (70) degrees with respect to an axis of rotation of the guide roller.

9. The guide roller according to claim 1, wherein the outer ring has first and second axial ends and defines first and second radial grooves, the first radial groove is located between the first axial end and the first raceway and the second radial groove is located between the second axial end and the second raceway, the first and second radial grooves each being configured to receive a seal therein such that the guide roller can be sealed.

10. The guide roller according to claim 1,
   wherein the inner ring defines an axially central region between the first row of rolling elements and the second row of rolling element, a portion of the inner ring which is located along the axially central region and which is located radially inward from the third raceway and the fourth raceway defines a radial opening for receiving lubricating grease.

11. A work roller in a wire rolling line including a guide roller according to claim 1.

12. A method comprising:
   providing a guide roller according to claim 1; and
   installing the guide roller as a finished component on the fixed shaft of the wire rolling line without adjusting the preload.

13. A method comprising:
providing a guide roller according to claim 4; and
installing the guide roller as a finished component on the fixed shaft of the wire rolling line without adjusting the preload.

14. A method comprising:
providing a guide roller according to claim 10; and
installing the guide roller as a finished component on the fixed shaft of the wire rolling line without adjusting the preload.

* * * * *